(12) United States Patent
Walter

(10) Patent No.: US 11,205,910 B2
(45) Date of Patent: Dec. 21, 2021

(54) METHOD FOR CHARGING OR DISCHARGING AN ENERGY STORE

(71) Applicant: Benning CMS Technology GmbH, March (DE)

(72) Inventor: Wolfram Walter, Eschbach (DE)

(73) Assignee: Benning CMS Technology GmbH, March (DE)

( * ) Notice: Subject to any disclaimer, the term of this patent is extended or adjusted under 35 U.S.C. 154(b) by 25 days.

(21) Appl. No.: 16/755,920

(22) PCT Filed: Jul. 31, 2018

(86) PCT No.: PCT/EP2018/070791
§ 371 (c)(1),
(2) Date: Apr. 14, 2020

(87) PCT Pub. No.: WO2019/081084
PCT Pub. Date: May 2, 2019

(65) Prior Publication Data
US 2020/0343736 A1 Oct. 29, 2020

(30) Foreign Application Priority Data
Oct. 23, 2017 (DE) .................... 10 2017 009 850.6

(51) Int. Cl.
*H01M 10/44* (2006.01)
*H02J 7/00* (2006.01)
*H01M 10/48* (2006.01)

(52) U.S. Cl.
CPC .......... *H02J 7/007* (2013.01); *H01M 10/441* (2013.01); *H01M 10/482* (2013.01); *H02J 7/0013* (2013.01); *H02J 7/0048* (2020.01)

(58) Field of Classification Search
CPC ........ H02J 7/007; H02J 7/0048; H02J 7/0013; H02J 7/1423; H02J 7/04; H01M 10/441; H01M 10/482; H01M 10/44; H01M 10/48
(Continued)

(56) References Cited

U.S. PATENT DOCUMENTS 6,373,226 B1 * 4/2002 Itou ..................... H01M 10/441
320/132
8,310,198 B2 11/2012 Kurimoto et al.
(Continued)

FOREIGN PATENT DOCUMENTS

DE        100 35 959 A1    4/2001
DE   10 2010 017 439 A1   12/2011
(Continued)

OTHER PUBLICATIONS

International Search Report of PCT/EP2018/070791, dated Dec. 13, 2018.
(Continued)

*Primary Examiner* — Edward Tso
(74) *Attorney, Agent, or Firm* — Collard & Roe, P.C.

(57) ABSTRACT

The invention relates to a method for charging or discharging an energy store (2) with at least one cell block (20) consisting of multiple series-connected battery cells (3-7) by means of a series charging current ($I_O$) flowing through all battery cells (3-7), wherein at least some of the battery cells (3-7) can have different capacitances ($C_N$).
In order to permit a reliable and quick charging of energy stores, the invention proposes measuring the capacitances ($C_N$) of the N battery cells of the cell block at regular time intervals, and determining a maximum charging current for each battery cell based on the measured capacitances and a predefined C-factor (ratio of the maximum charging current
(Continued)

$I_{N;max}$ to the capacitance $C_N$) for each battery cell. With these maximum charging currents, the battery cells are then simultaneously charged during a charging time t (t≤1/C) predefined by the C-factor. In addition, the battery cells with a maximum charging current that corresponds to the series charging current $I_O$ are only charged by the series charging current; the battery cells with a maximum charging current $I_{N;max}$ that is greater than the series charging current are simultaneously charged by the series charging current and by the auxiliary charging currents $I_N$ that can be removed from the cell block, for which $I_N=I_{N;max}-I_O$; and the battery cells with a maximum charging current $I_{N;max}$ that is lower than the series charging current $I_o$ are charged by the series charging current, wherein, simultaneously, the currents $I_o-I_{N;max}$ exceeding the maximum charging currents $I_{N;max}$ are supplied to the cell block as discharging currents.

9 Claims, 1 Drawing Sheet

(58) Field of Classification Search
USPC .................. 320/107, 116, 118, 19, 132, 149; 324/429–434; 340/636.1, 636.12, 636.19; 702/63, 64
See application file for complete search history.

(56) References Cited

U.S. PATENT DOCUMENTS

| | | | |
|---|---|---|---|
| 8,456,132 B2 | 6/2013 | Kinoshita et al. | |
| 9,438,059 B2 | 9/2016 | Komoda et al. | |
| 2013/0271068 A1* | 10/2013 | Komoda | H02J 7/007 320/107 |

FOREIGN PATENT DOCUMENTS

| | | |
|---|---|---|
| DE | 11 2011 104 434 T5 | 9/2013 |
| DE | 10 2012 020 544 A1 | 4/2014 |
| DE | 10 2013 005 104 A1 | 10/2014 |
| DE | 10 2015 007 405 A1 | 12/2016 |
| EP | 1 941 594 B1 | 1/2013 |
| JP | 3796918 B2 | 7/2006 |
| KR | 20130049706 A | 5/2013 |
| RU | 2471276 C2 | 12/2012 |
| RU | 2516297 C2 | 5/2014 |
| WO | 2012/139604 A1 | 10/2012 |

OTHER PUBLICATIONS

English translation of Russian Search Report in RU 20 2011 6449/07 dated Aug. 18, 2020.
International Preliminary Report on Patentability in PCT/EP2018/070791, dated Dec. 6, 2019.

* cited by examiner

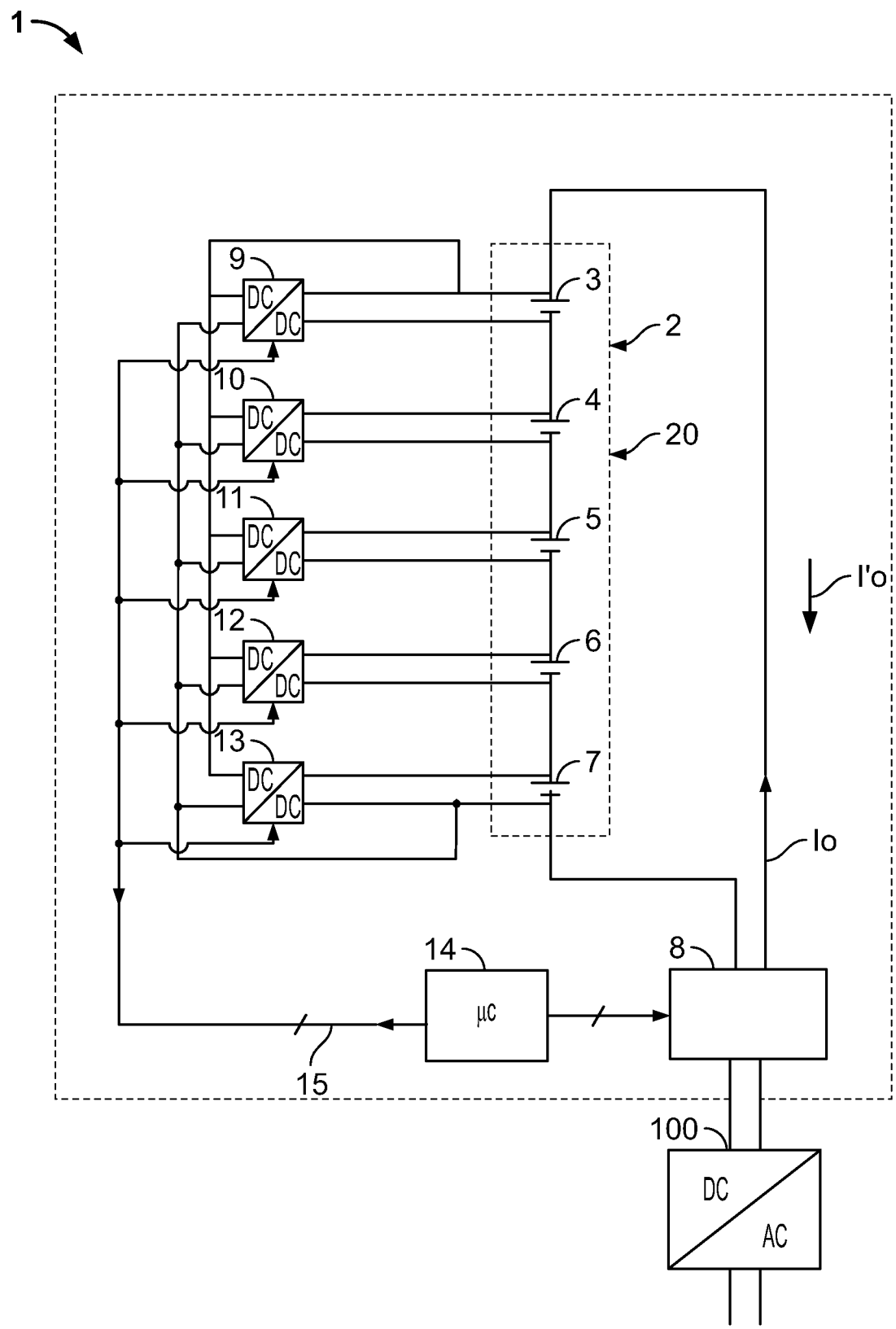

METHOD FOR CHARGING OR DISCHARGING AN ENERGY STORE

CROSS REFERENCE TO RELATED APPLICATIONS

This application is the National Stage of PCT/EP2018/070791 filed on Jul. 31, 2018, which claims priority under 35 U.S.C. § 119 of Germany Application No. 10 2017 009 850.6, filed on Oct. 23, 2017, the disclosure of which is incorporated by reference. The international application under PCT article 21(2) was not published in English.

The invention relates to a method for charging or discharging an energy store with at least one cell block consisting of multiple series-connected battery cells by means of a series charging or discharging current flowing through all battery cells, wherein at least some of the battery cells can have different capacitances.

In the case of energy stores (accumulators) consisting of multiple series-connected, rechargeable battery cells, it is important, among other things, for the service life of the energy store that each individual cell is neither overcharged nor undercharged when the energy store is charged and that all cells have the same state of charge where possible. This applies in particular to energy stores consisting of multiple series-connected lithium-ion batteries, lithium-polymer batteries and/or lithium-iron-phosphate batteries.

As a rule, such energy stores are therefore connected to an appliance, often also referred to as a battery management system, which on the one hand constantly monitors the state of charge of the individual battery cells by means of a charge control device and on the other hand attempts to balance the individual battery cells should they have different states of charge. The states of charge of the battery cells can be balanced by passive or active balancing. In addition, in the case of the known battery management systems, charge balancing only begins when at least one of the battery cells is fully charged, so the entire charging process of a cell block is relatively time-consuming.

In the case of passive balancing, the battery cell that reaches its end-of-charge voltage first converts the surplus energy into heat via a resistor, thus rendering it lost for the charging process.

In the case of active balancing, on the other hand, the energy removed from a battery cell with too high a cell voltage is not converted into thermal energy but is used to charge the other cells of the energy store. However, even in the case of active balancing, charge balancing only begins when at least one of the battery cells of the cell block has reached its end-of-charge voltage.

From EP 1 941 594 B1, a method for charging an energy store with a cell block consisting of multiple series-connected battery cells is known, wherein it is proposed to charge the battery cells by a series charging current flowing through all battery cells and to overcharge a selected battery cell in a defined manner by an additional selective charging process. The state of charge of the selected battery cell is then adjusted to the states of charge of the other battery cells. The cell block is preferably used for selective charging of the selected battery cell. Such overcharging of individual battery cells is possible with lead or nickel-cadmium batteries, but not with lithium-ion batteries, lithium-polymer batteries and/or lithium-iron-phosphate batteries, which would be destroyed immediately.

From DE 10 2010 017 439 A1, a method for charging an energy store with multiple series-connected battery cells is known, wherein the individual battery cells are charged separately via corresponding auxiliary charge controllers connected to the AC voltage network and then charge balancing between the individual cells is carried out by means of these auxiliary charge controllers.

Finally, from DE 10 2012 020 544 A1, a method for charging an energy store with multiple series-connected battery cells is known, wherein, in order to speed up the charging process, in addition to the series charging current flowing through all of the cells, an auxiliary charging current is supplied to the battery cells, wherein the falling below of the respective predefined state of charge is measured. For selective charging of the selected battery cells, this method preferably uses a separate DC source.

In the case of the known methods outlined above, to determine the respective state of charge of a corresponding battery cell, its respective cell voltage is measured and then, if necessary, charge balancing between the battery cells of different states of charge is initiated when the cell voltage exceeds or falls below predefined cell voltage values. However, there is the problem that the cell voltage remains largely constant during the respective charging process of a battery cell, so it is difficult to draw conclusions from the cell voltage about the current state of charge of the corresponding battery cell. Only shortly before the respective end-of-charge or end-of discharge voltage is reached is there a relatively strong rise or fall in the respective cell voltage that can be used for corresponding control processes for charge balancing.

The invention is based on the task of providing a method for charging or discharging energy stores that enables more reliable and faster charging or discharging of the energy store compared to known methods, particularly also when the individual battery cells of the cell block have different capacitances. It should also be possible to indicate the respective state of charge or discharge for each of the battery cells at any time during the charging or discharging process.

According to the invention, this task is fulfilled with regard to the charging of the energy store by the characteristics of claim 1 and with regard to the discharging of the energy store by the characteristics of claim 2. Additional, particularly advantageous designs of the invention are revealed in the sub-claims.

In contrast to the known methods, wherein the charging of the individual battery cells is controlled by measuring the cell voltages and, based on the measured cell voltages, charge balancing between the individual battery cells is only carried out when at least one of the battery cells is fully charged, the invention proposes measuring the capacitances $C_N$ of the N battery cells of a cell block at regular intervals and determining the charging current of each battery cell based on the measured capacitances and a predefined C-factor (quotient of a maximum charging current $I_{N;max}$, to the capacitance $C_N$). These charging currents are then used to charge the N battery cells simultaneously during a charging time t (t≤1/C) predefined by the C-factor. In this case, the battery cells with a maximum charging current that corresponds to the series charging current $I_o$ are charged only by the series charging current; the battery cells with a maximum charging current $I_{N;max}$ that is greater than the series charging current are charged simultaneously by the series charging current and by the auxiliary charging currents $I_N$ that can be removed from the cell block via auxiliary charging/discharging devices, for which $I_N = I_{N;max} - I_O$; and the battery cells with a maximum charging current $I_{N;max}$ that is lower than the series charging current $I_O$ are charged by the series charging current, wherein the currents exceeding the maximum charging currents $I_{N;max} : I_O - I_{N;max}$, are simultaneously supplied to the cell block as auxiliary discharging currents by auxiliary charging/discharging devices.

If, for example, due to the low available voltage of an energy source, the calculated maximum charging currents ($I_{N;max}$) are all greater than the available series charging current ($I_o$), all battery cells are charged simultaneously with charging currents with values that are in the same ratio to each other as the calculated maximum charging currents ($I_{N;max}$).

The above applies accordingly with regard to the discharging of the energy store. Only the current directions are reversed, i.e. the charging current now becomes the discharging current, the auxiliary charging currents become auxiliary discharging currents, and the auxiliary discharging currents become auxiliary charging currents.

When using the method according to the invention, all battery cells have the same state of charge during charging or discharging in relation to their respective useful capacity. This makes it possible to indicate the respective state of charge of each of the battery cells of this cell block at any time, in relation to the maximum charged or discharged state of the cell block.

The maximum charging or discharging time for this method is derived from the relationship $t_{max}=1/C$ and is identical for all battery cells and is significantly shorter than is possible with known methods. If this charging or discharging time is observed, no overcharging or undercharging of individual cells occurs.

Since all battery cells, regardless of their respective capacitance, have the same state of charge after the maximum charging time in relation to their respective useful capacity, there is no need for additional active or passive balancing.

In a first preferred example of implementation of the invention, provision is made for the series charging current being selected in such a way that the battery cell with the smallest capacitance is charged at its maximum charging current and that the other cells are each charged, in addition to the series charging current, at a maximum auxiliary charging current that results from the difference between the capacitance of the respective battery cell and the battery cell with the smallest capacitance.

In a second example of implementation, provision is made for the series charging current being selected in such a way that it corresponds to the maximum charging current of an average capacitance determined from all battery cells. During the charging process, a part of the series charging current is then supplied back to the cell block via the assigned auxiliary charging/discharging devices for those battery cells that have a lower capacitance than the average capacitance. On the other hand, the battery cells that have a higher capacitance than the average capacitance are charged simultaneously by the series charging current and auxiliary charging currents.

In a third example of implementation, provision is made for the series charging current being selected in such a way that the battery cell(s) with the highest capacitance is/are charged at its/their maximum charging current. In this case, the other cells are only partially charged by the series charging current and the respective surplus proportion of current of the series charging current is supplied back to the cell block via assigned auxiliary charging/discharging devices.

For discharging of the energy store, the three examples of implementation described above again show that only the current directions change, i.e. the charging current becomes the discharging current, the auxiliary charging currents become auxiliary discharging currents and the auxiliary discharging currents become auxiliary charging currents.

In order to ensure that the intended charging and discharging of the energy store is carried out without time-consuming interruption to determine the battery capacitances, the capacitance measurements are preferably carried out automatically at certain time intervals with series-connected battery cells.

In a first preferred example of implementation, to this end the battery cells are initially charged by the series charging current until their end-of-charge voltage is reached, wherein overcharging of those battery cells that have initially reached their end-of-charge voltage is prevented by the surplus proportion of current being supplied back to the cell block via the auxiliary charging/discharging devices assigned to them. The battery cells are then discharged with a defined series discharging current until the end-of-discharge voltage of the battery cell with the highest capacitance is reached. In order to avoid undercharging of those battery cells that have reached their end-of-discharge voltages before the battery with the highest capacitance, after they have reached their end-of-discharge voltages these battery cells are supplied with current from the cell block via the auxiliary charging/discharging devices assigned to them.

The capacitance of the corresponding battery cell (capacitance ($C_N$)=discharging current ($I_o'$)×discharge time (t)) is then derived from the time course of the discharging current between the charged state of the battery cells and the respective battery cell reaching the end-of-discharge voltage that is then used for the further optimum charging and discharging processes of the cell block.

Of course, the time course of the charging process can also be used to determine the capacitance, or an average value between the capacitance values determined during discharging and charging of the battery can be used.

A second preferred example of implementation takes into account that when battery cells are connected in series, the end-of-charge voltage of the entire cell block is usually lower than the sum of the end-of-charge voltages of the individual battery cells.

In the case of capacitance measurement, therefore, the cell block is first charged up to its end-of-charge voltage and then each individual battery cell is further charged with the aid of its assigned auxiliary charging/discharging devices until its end-of-charge voltage is reached.

The capacitance of the corresponding battery cell is then determined from the time course of the discharging current between the charged state of the battery cells and the respective battery cell reaching the end-of-discharge voltage. First, the entire cell block is discharged via the series discharging current to a depth of discharge (DoD) of 80% (i.e. the cell block still has a residual capacitance of 20%). Each individual battery cell is then again discharged to its respective end-of-discharge voltage via the auxiliary charging/discharging device assigned to it.

Also in this case, the time course of the respective charging process can be used to measure the capacitances of the battery cells, or an average value between the capacitance values determined during charging and discharging of the batteries can be used.

Further details and advantages of the invention can be seen in the following example of implementation that is described in a block diagram.

In the figure, 1 represents an appliance for charging and discharging an energy store designated 2 that is used, for example, to supply energy to a supply network of a building and can be charged and discharged by a system for generating renewable energy (photovoltaic installation, wind turbine, biogas plant, etc.), for example via a bidirectional AC/DC converter 100.

In the example of implementation shown, the energy store 2 comprises a cell block 20 with five series-connected rechargeable battery cells 3-7 and can be charged and discharged by a controllable main charging/discharging device 8.

In addition, each of the battery cells 3-7 is connected to cell block 20 via a controllable auxiliary charging/discharging device 9-13 that is assigned to it. The auxiliary charging/discharging devices 9-13 are preferably controllable bidirectional DC/DC converters.

A monitoring and control device 14, which is connected via corresponding data lines 15 both to the auxiliary charging/discharging devices 9-13 and to the main charging/discharging device 8, is provided to check the state of charge or discharge of the individual battery cells 3-7.

The charging process of the energy store 2 of the appliance 1 according to the invention is described in more detail below:

First, the capacitances $C_N$ of the individual battery cells 3-7 are measured and stored in a memory of a monitoring and control device 14 (for example, the capacitances $C_3$, $C_5$ and $C_6$ of battery cells 3, 5 and 6 are about 2 Ah, the capacitance $C_4$ of battery cell 4 is about 2.5 Ah and the capacitance $C_7$ of battery cell 7 is about 3 Ah).

If the individual battery cells 3-7 are later to be charged, for example, at a charging current of 1C (the C-factor forms the quotient of a maximum charging current $I_{N;max}$ to the capacitance $C_N$), then the monitoring and control device 14 then calculates the maximum charging currents $I_{N;max}$ for the individual battery cells 3-7 (for the above-mentioned capacitances, with $I_{N;max}=C \times C_N$ for battery cells 3, 5, and 6, these are each 2 A, and for battery cells 4 and 7, 2.5 A and 3 A) and also stores these values in a corresponding memory.

As soon as a non-displayed control device now determines that the energy of, for example, a plant for generating renewable energy is greater than the energy required by the supply network, at least a part of the surplus energy reaches the main charging/discharging device 8 of the appliance 1 according to the invention via the AC/DC converter 100. Appliance 1 then generates a series charging current $I_O$ of a predefined strength.

In order to now charge all battery cells 3-7 simultaneously at the maximum charging currents $I_{N;max}$ assigned to these cells, the monitoring and control device 14 ensures that the battery cells 3-7 with a maximum charging current $I_{N;max}$ that corresponds to the series charging current $I_O$ are only charged by the series charging current $I_O$. The battery cells 3-7 with a maximum charging current $I_{N;max}$ that is, in contrast, greater than the series charging current $I_O$ are charged simultaneously by the series charging current $I_O$ and by the auxiliary charging currents $I_N$ that can be removed from the cell block 20 by means of appropriate auxiliary charging/discharging devices 9-13, for which: $I_N=I_{N;max}-I_O$. Finally, battery cells 3-7 with a maximum charging current $I_{N;max}$ that is lower than the series charging current $I_O$ are charged by the first charging current $I_O$, while the currents exceeding the maximum charging currents $I_{N;max}$: $I_O-I_{N;max}$ are simultaneously supplied to the cell block 20 as discharging currents.

For example, if the series charging current $I_O$ is selected in such a way that the battery cells 3, 5 and 6 with the lowest capacitance (in the case of the above-mentioned example, 2 Ah each) are charged at their maximum charging current ($I_{max}=2$ A) ($I_O$ is therefore 2 A), then the other battery cells 4 and 7 must each be charged, in addition to the series charging current $I_O$, at a maximum auxiliary charging current (of 0.5 A or 1 A) from the auxiliary charging/discharging device 10 and 13 assigned to them that results from the difference between the capacitance of the respective battery cell (4, 7) and the battery cell with the lowest capacitance (here, the battery cells 3, 5 and 6).

By monitoring the end-of-charge voltages at the battery cells 3-7, the monitoring and control device 14 monitors the charging time during which the battery cells 3-7 can be charged at their maximum charging current without overcharging the respective battery cell (in the example above $t_{max}=1/C=60$ min).

If, for example, due to the low available voltage of an energy source, the calculated maximum charging currents ($I_{N;max}$) are all greater than the available series charging current ($I_O$), all battery cells are charged simultaneously at charging currents with values that are in the same ratio to each other as the calculated maximum charging currents ($I_{N;max}$). So, if the series charging current $I_O$ is only 1 A in the above-mentioned example of implementation, battery cells 3, 5 and 6 are charged at 1 A, and battery cell 4 is charged at 1.25 A and battery cell 7 at 1.5 A.

In order to determine the capacitances of the battery cells 3-7 automatically at predefined time intervals (e.g. after every 100 charging/discharging cycles) with the series-connected battery cells 3-7, first the cell block 20 is charged up to its end-of-charge voltage and then each individual battery cell 3-7 is further charged with the aid of the auxiliary charging/discharging devices 9-13 assigned to it until its end-of-charge voltage is reached.

Once all of the battery cells 3-7 have been charged, a defined discharge of battery cells 3-7 takes place by means of the appliance 1. First, the entire cell block 20 is discharged to a depth of discharge (DoD) of 80% at a series discharging current $I_O'$ that is set by the main charging/discharging device 8. Then, each individual battery cell 3-7 is discharged to its respective end-of-discharge voltage via the auxiliary charging/discharging device 9-13 assigned to it.

The capacitance $C_N$ of the corresponding battery cell can then be determined from the measured course of the series discharging current $I_O'$ between the beginning of all of the battery cells 3-7 discharging and the respective battery cell reaching the end-of-discharge voltage.

However, the time course of the respective charging process can also be used to measure the capacitances of the battery cells, or an average value between the capacitance values determined during charging and discharging of the batteries can be used.

Of course, the invention is not limited to the present example of implementation.

For example, the capacitances of battery cells 3-7 can also be determined by first charging all battery cells 3-7 until their end-of-charge voltage is reached by means of a series charging current $I_O$ generated by the main charging/discharging device 8. In order to prevent overcharging of those battery cells that have a lower end-of-charge voltage than the battery cell(s) with the maximum capacitance (battery cell 7 in the example above), the surplus current is supplied to the cell block 20 via the auxiliary charging/discharging device 9-13 assigned to it/them.

Once all of the battery cells 3-7 have been charged, a defined discharge of battery cells 3-7 takes place by means of the appliance 1. For this purpose, the battery cells 3-7 are discharged with a series discharging current $I_O'$ as set by the main charging/discharging device 8 until the end-of-discharge voltage of the battery cell with the highest capacitance is reached. In order to avoid undercharging of those battery cells that have reached their end-of-discharge voltages before the battery with the highest capacitance, after they have reached their end-of-discharge voltages these battery cells are supplied with auxiliary charging current from the cell block 20 by the auxiliary charging/discharging device assigned to them.

The capacitance $C_N$ of the corresponding battery cell can then be determined from the measured course of the series discharging current $I_O'$ between the beginning of all of the battery cells 3-7 discharging and the respective battery cell reaching the end-of-discharge voltage.

Furthermore, not all of the battery cells' capacitances need to be determined in one charging/discharging cycle. Rather, it may also be advantageous to determine the capacitances of the battery cells one after the other in multiple charging/discharging cycles.

In addition, the series charging or discharging current does not necessarily have to be selected in such a way that it corresponds to the maximum charging or discharging current of the battery cell with the lowest capacitance. Rather, it can also be selected, for example, so that it corresponds to the maximum charging or discharging current of a battery cell with an average capacitance or a battery cell with the highest capacitance, etc.

Finally, the energy store can also consist of multiple cell blocks comprising series battery stores.

LIST OF REFERENCE NUMERALS

1 Appliance
2 Energy store
20 Cell block
3-7 Battery cells, cells
8 Main charging/discharging device
9-13 Auxiliary charging/discharging devices
14 Monitoring and control device
15 Data line
$I_O$ Series charging current
$I_O'$ Series discharging current

The invention claimed is:

1. A method for charging an energy store (2) with at least one cell block (20) comprising multiple series-connected battery cells (3-7) by means of a series charging current ($I_o$) flowing through all battery cells (3-7), wherein at least some of the battery cells (3-7) can have different capacitances ($C_N$), with the characteristics:
   a) at predefined time intervals, the capacitances ($C_N$) of the individual battery cells (3-7) are measured and stored in a memory of a monitoring and control device (14);
   b) taking into consideration a predefined C-factor (quotient of a maximum charging current $I_{N;max}$ to the capacitance $C_N$), the maximum charging currents ($I_{N;max}$) that are characteristic of the individual capacitances ($C_N$) are then determined by the monitoring and control device (14);
   c) then, during a predefined time $t \leq 1/\text{C-factor}$, the battery cells (3-7) are charged simultaneously at the maximum charging currents ($I_{N;max}$) assigned to these battery cells (3-7), wherein
      the battery cells (3-7) with a maximum charging current ($I_{N;max}$) that corresponds to the series charging current ($I_o$) are charged only by the series charging current ($I_o$),
      the battery cells (3-7) with a maximum charging current $I_{N;max}$ that is greater than the series charging current ($I_o$) are simultaneously charged by the series charging current ($I_o$) and by auxiliary charging currents $I_N$ that can be removed from the cell block (20) via auxiliary charging/discharging devices (9-13), for which: $I_N = I_{N;max} - I_o$, and
      the battery cells (3-7) with a maximum charging current $I_{N;max}$ that is lower than the series charging current ($I_o$) are charged by the series charging current $I_O$, wherein the currents that exceed the maximum charging currents $I_{N;max}$: ($I_o - I_{N;max}$) are simultaneously supplied to the cell block (20) as auxiliary discharging currents via corresponding auxiliary charging/discharging devices,
   or, if the calculated maximum charging currents ($I_{N;max}$) are all greater than the available series charging current ($I_o$), simultaneously at charging currents with values that are in the same ratio to one another as the calculated maximum charging currents ($I_{N;max}$).

2. A method for discharging an energy store (2) with at least one cell block (20) comprising multiple series-connected battery cells (3-7) by means of a series discharging current ($I_o$) flowing through all battery cells (3-7), wherein at least some of the battery cells (3-7) can have different capacitances ($C_N$), with the characteristics:
   a) at predefined time intervals, the capacitances ($C_N$) of the individual battery cells (3-7) are measured and stored in a memory of a monitoring and control device (14);
   b) taking into consideration a predefined C-factor (quotient of a maximum charging current $I_{N;max}$ to the capacitance $C_N$), the maximum discharging currents ($I_{N;max}$) that are characteristic of the individual capacitances ($C_N$) are then determined by the monitoring and control device (14);
   c) then, during a predefined time $t \leq 1/\text{C-factor}$, the battery cells (3-7) are discharged at the maximum discharging currents ($I_{N;max}$) assigned to these battery cells (3-7), wherein simultaneously
      the battery cells (3-7) with a maximum discharging current ($I_{N;max}$) that corresponds to the series discharging current ($I_o'$) are only discharged by the series charging current ($I_o'$),
      the battery cells (3-7) with a maximum discharging current $I_{N;max}$ that is greater than the series discharging current ($I_o'$) are discharged simultaneously by the series discharging current ($I_o'$) and by the auxiliary discharging currents $I_N'$ that can be supplied from the cell block (20) via auxiliary charging/discharging devices (9-13), for which: $I_N' = I_{N;max} I_o'$, and
      the battery cells (3-7) with a maximum discharging current $I_{N;max}$ that is lower than the series discharging current ($I_o'$) are discharged by the series discharging current $I_o'$, wherein the currents exceeding the maximum discharging currents: ($I_o' - I_{N;max}$) are simultaneously supplied to the cell block (20) as auxiliary charging currents via corresponding auxiliary charging/discharging devices (9-13).

3. The method according to claim 1, wherein the series charging current ($I_o$) is selected in such a way that the battery cell (3-7) with the lowest capacitance is charged at its maximum charging current, and wherein the other battery cells (3-7) are each charged, in addition to the series charging current ($I_o$), at a maximum auxiliary charging current that results from the difference between the capacitance of the respective battery cell and the battery cell with the lowest capacitance.

4. The method according to claim 1, wherein the series charging current ($I_o$) is selected in such a way that it corresponds to the maximum charging current of a battery cell (3-7) that has an average capacitance determined from all of the battery cells (3-7), wherein during the charging process at the battery cells (3-7) that have a lower capacitance than the average capacitance, a part of the series charging current ($I_o$) is supplied back to the cell block, and wherein the battery cells that have a higher capacitance than the average capacitance are charged simultaneously by the first charging current and auxiliary charging currents that can be removed from the overall battery.

5. The method according to claim 1, wherein the series charging current ($I_o$) is selected in such a way that the battery cell (3-7) with the highest capacitance is charged at its maximum charging current, and wherein the other battery cells (3-7) are only partially charged by the series charging current (10) and the proportions of current exceeding their maximum charging currents are supplied to the cell block (20).

6. The method according to claim 1, wherein the capacitances of the individual battery cells (3-7) of a cell block (20) are automatically measured with series-connected battery cells (3-7).

7. The method according to claim 6, wherein
firstly, the entire cell block (20) is charged by the series charging current ($I_o$) until its end-of-charge voltage is reached and then each individual battery cell (3-7) of the cell block (20) is further charged with the aid of the auxiliary charging/discharging devices (9-13) assigned to it until its end-of-charge voltage is reached,
then, the cell block (20) is then discharged with a series discharging current ($I_o'$) to a depth of discharge of 80% and each individual battery cell (3-7) is then discharged to its respective end-of-discharge voltage via the auxiliary charging/discharging device (9-13) assigned to it, and
finally, their capacitances are determined from the discharging currents of the cell block and the individual battery cells integrated over time.

8. The method according to claim 6, wherein
firstly, all of the battery cells (3-7) are charged by the series charging current ($I_o$) until they reach their end-of-charge voltage, wherein overcharging of those battery cells (3-7) that have a lower end-of-charge voltage than the battery cells (3-7) with the maximum capacitance is prevented by the surplus current being supplied via the auxiliary charging/discharging devices (9-13) of the cell block (20) that are respectively assigned to them,
the battery cells (3-7) are then discharged with a predefined series discharging current ($I_o'$) until the end-of-discharge voltage of the battery cell (3-7) with the greatest capacitance is reached, wherein, in order to avoid undercharging of those battery cells (3-7) that have reached their end-of-discharge voltages before the battery (3-7) with the greatest capacitance, auxiliary charging currents are supplied to these battery cells (3-7) from the cell block (20) via the auxiliary charging/discharging devices (9-13) assigned to them, and
the capacitance of each battery cell (3-7) is then determined from the measured time courses of the discharging current ($I_o'$) between the charged state of all battery cells (3-7) and the respective battery cell (3-7) reaching the end-of-discharge voltage.

9. The method according to claim 7, wherein the time course of the respective charging process is also used to determine the capacitances of the battery cells and the average value between the capacitance values measured during charging and discharging of the corresponding batteries is used as the capacitance of the respective battery cell.

* * * * *